United States Patent [19]

Check, III et al.

[11] Patent Number: 5,467,217
[45] Date of Patent: Nov. 14, 1995

[54] LIGHT VALVE SUSPENSIONS AND FILMS CONTAINING UV ABSORBERS AND LIGHT VALVES CONTAINING THE SAME

[75] Inventors: Joseph A. Check, III, West Bayshore; Robert L. Saxe, New York; Robert I. Thompson, Plainview; Matthew Forlini, Ozone Park; Steven M. Slovak, Hicksville, all of N.Y.

[73] Assignee: Research Frontiers Incorporated, Woodbury, N.Y.

[21] Appl. No.: 59,980

[22] Filed: May 11, 1993

Related U.S. Application Data

[63] Continuation-in-part of Ser. No. 972,826, Nov. 6, 1992, and Ser. No. 972,830, Nov. 6, 1992, which is a continuation-in-part of Ser. No. 786,511, Nov. 1, 1991, abandoned, said Ser. No. 972,826 is a continuation-in-part of Ser. No. 786,511.

[51] Int. Cl.⁶ ...................................................... G02F 1/01
[52] U.S. Cl. ............................................. 359/296; 359/361
[58] Field of Search ............................... 359/296, 51, 361

[56] References Cited

U.S. PATENT DOCUMENTS

| | | | |
|---|---|---|---|
| 4,273,422 | 6/1981 | Saxe | 359/296 |
| 4,304,895 | 12/1981 | Loshaek | 526/313 |
| 4,528,311 | 7/1985 | Beard et al. | 524/91 |
| 4,612,358 | 9/1986 | Besecke et al. | 526/259 |
| 4,785,063 | 11/1988 | Slongo et al. | 526/259 |
| 4,868,251 | 9/1989 | Reich et al. | 525/479 |
| 4,919,521 | 4/1990 | Tada et al. | 359/296 |
| 5,103,336 | 4/1992 | Sieloff | 359/361 |
| 5,112,912 | 5/1992 | Nikles | 525/123 |

OTHER PUBLICATIONS

Tinuvin 327 Brochure.
Tinuvin 328 Brochure.
Tinuvin 384 Brochure.

*Primary Examiner*—Paul M. Dzierzynski
*Assistant Examiner*—Audrey Chang
*Attorney, Agent, or Firm*—Rosenman & Colin

[57] ABSTRACT

Light valve suspensions and light valve films are provided with a UV absorber.

24 Claims, No Drawings

LIGHT VALVE SUSPENSIONS AND FILMS CONTAINING UV ABSORBERS AND LIGHT VALVES CONTAINING THE SAME

The present application is a continuation-in-part of copending U.S. applications Ser. Nos. 972,826 And 972,830, both filed Nov. 6, 1992, the contents of which are incorporated herein by reference thereto, which are each continuations-in-part of then copending U.S. application Ser. No. 786,511, filed Nov. 1, 1991, now abandoned.

FIELD OF THE INVENTION

The present invention relates to fluid suspensions for light valves and more particularly to methods and materials for stabilizing liquid suspensions and films thereof from ultraviolet radiation.

BACKGROUND

Light valves have been used for almost 60 years for modulation of light. A light valve may be described as a cell formed of two walls that are spaced apart by a small distance, at least one wall being transparent, the walls having electrodes thereon usually in the form of transparent electrically conductive coatings. The cell contains a "light valve suspension" which may be either a liquid light valve suspension or a film containing droplets of a liquid light valve suspension as described hereinafter. The liquid light valve suspension comprises a plurality of small particles suspended in a liquid suspending medium. In the absence of an applied electrical field, the particles in the liquid light valve suspension exhibit random Brownian movement, and hence a beam of light passing into the cell is reflected, transmitted or absorbed, depending upon the nature and concentration of the particles and the energy content of the light. When an electric field is applied through the light valve suspension in the light valve, the particles become aligned and for many suspensions most of the light can pass through the cell. Light valves have been proposed for many purposes including, e.g., alphanumeric displays, television displays, windows, mirrors, filters, ski goggles, eyeglasses and the like to control the amount of light passing therethrough. Alternatively, in place of the liquid light valve suspension described above, one may use in the light valve a film comprising a polymer matrix having droplets of a liquid suspension distributed throughout the polymer matrix, such as is described in the aforesaid copending U.S. patent applications Ser. Nos. 972,826 and 972,830. All of the patents and patent applications referred to in this specification are incorporated herein by reference thereto. For more details, see the section, infra, entitled "Light Valve Films".

The Light Valve Suspension

The light valve suspension of the present invention may be any liquid light valve suspension comprising droplets of a liquid light valve suspension for a light valve known in the art or known to the inventors of the present invention or hereafter known and may be formulated according to known techniques. The term "light valve liquid suspension" or "liquid suspension" as used herein means a "liquid suspending medium" in which a plurality of small particles are dispersed. The "liquid suspending medium" comprises one or more nonaqueous, electrically resistive liquids in which there is preferably dissolved at least one type of polymeric stabilizer which acts to reduce the tendency of the particles to agglomerate and acts to keep them dispersed.

As is known, inorganic and organic particles may be used in a light valve suspension, such as mica, metals, graphite, metal halides, polyhalides (sometimes referred to in the prior art as perhalides) of alkaloid acid salts and the like. The particles in the liquid suspension may be light-polarizing, such as halogen-containing light-polarizing materials, e.g., polyhalides of alkaloid acid salts. (The term "alkaloid" is used herein to mean an organic nitrogenous base, as defined in Hackh's Chemical Dictionary, Fourth Edition, McGraw-Hill Book Company, New York, 1969). If a polyhalide of an alkaloid acid salt is used, the alkaloid moiety may be quinine alkaloid, as defined in Hackh's Chemical Dictionary, supra. U.S. Pat. Nos. 2,178,996 and 2,289,712 refer in detail to the use of polyhalides of quinine alkaloid acid salts. The particles may be light-absorbing or light-reflecting.

Also, the particles may be particles of a hydrogenated polyhalide of a quinine alkaloid acid salt, such as dihydrocinchonidine bisulfate polyiodide, as described in U.S. Pat. No. 4,131,334, or a light-polarizing metal halide or polyhalide, such as cupric bromide or purpureocobaltchloride sulfate polyiodide, as, e.g., in U.S. Pat. No. 1,956,867. Preferably, the particles are light-polarizing polyhalide particles such as those described in U.S. Pat. Nos. 4,877,313 and 5,002,701 which are more environmentally stable than prior art polyhalides.

In theory, any type of particle capable of reflecting, absorbing and/or transmitting desired wavelengths of visible light can be used in the light valve suspension.

The shape of the particles used in the light valve suspension should preferably be "anisometric", i.e. the shape or structure of the particle is such that in one orientation the particle intercepts more light than in another orientation. Particles which are needle-shaped, rod-shaped, lath-shaped, or in the form of thin flakes, are suitable.

The particles are preferably of colloidal size, that is the particles will have a large dimension averaging about 1 micron or less. It is preferred that most particles have large dimensions less than one-half of the wavelength of blue light, i.e. 2000 Angstroms or less to keep light scatter extremely low.

Any type of particle which when in suspension is orientable in an electric or magnetic field is usable including both light-scattering and light-absorbing particles. However, particles that absorb visible light that impinges on them are preferred because they exhibit very little light scatter, and light-polarizing crystals are especially preferred and useful because they produce a pleasing visual appearance.

Light-absorbing particles comprise many types of material including colored orientable pigments and dyes, e.g. garnet red, conductive black or grey material such as graphite or carbon black, dichroic dyes such as are widely used in guest-host liquid crystal devices, light-polarizing materials, e.g., cupric bromide, and polyhalides, and especially polyiodides, e.g., those described in conjunction with prior art light valve devices.

The term "polyiodide" as used herein is used in the conventional sense and also in the same sense as the term "periodide" is used in numerous prior art light valve patents, e.g., see column 1 of U.S. Pat. No. 1,951,664 (Land) entitled "Colloidal Suspensions and the Process of Making Same," to indicate a material which is a reaction product of a precursor compound, which may be a sulfate (or certain other salts as described in U.S. Pat. No. 4,270,841) of heterocyclic nitrogenous bases with iodine and an iodide. Such reaction products are often called polyiodide compounds. This type of particle is discussed in detail in "The Optical Properties and Structure of Polyiodides" by D. A. Godina and G. P. Faerman published in The Journal of General Chemistry, U.S.S.R. Vol. 20, pp. 1005–1016, (1950). Herapathite, for example, is quinine bisulfate polyiodide, and its formula is given under the heading "quinine iodosulfate" as $4C_{20}H_{24}N_2O_2.3H_2SO_4.2HI.I_4.6H_2O$ in The Merck Index, 10th Ed. (Merck & Co., Inc., Rahway, N.J.). In more modern, preferred types of polyiodides, the precursor compound need not be a salt, e.g., see U.S. Pat. Nos. 4,877,313 and 5,002,701. In these polyiodide compounds the iodine is thought to form chains and the compounds are strong light polarizers. The term "polyhalide" is used herein to mean a compound such as a polyiodide, but wherein at least some of the iodine in the iodide is replaced by another halogen element.

The light valve suspension of the present invention may include any of the liquid suspending media previously proposed for use in light valves for suspending the particles. In general, the liquid suspending medium may comprise one or more electrically resistive, chemically inert liquids that will both suspend the particles and dissolve any polymeric stabilizer used to reduce the tendency of the particles to agglomerate and thus keep the particles in suspension. Liquid suspending media that are known in the art are useful herein, such as the liquid suspending media disclosed in U.S. Pat. No. 4,247,175. In general, one or both of the liquid suspending medium or the polymeric stabilizer dissolved therein is chosen so as to maintain the suspended particles in gravitational equilibrium.

A light valve suspension useful in the present invention is described in U.S. Pat. No. 4,407,565 and is based upon the use as the liquid suspending medium of an electrically resistive, chemically inert, low molecular weight liquid fluorocarbon polymer having a specific gravity at room temperature of at least about 1.5 and having at least about 50% of its atoms constituted by halogen atoms, at least 60% of the halogen atoms being fluorine and the balance chlorine and/or bromine. Preferably, the liquid suspending medium also comprises a miscible electrically resistive organic liquid such as, for example, trialkyl trimellitate, etc. to provide gravitational equilibrium to the suspended particles and to assist in dispersing the particles in the liquid suspending medium. Other materials useful as the miscible electrically resistive organic liquid are those disclosed in U.S. Pat. No. 4,772,103, and details concerning the liquid suspending material may be found in U.S. Pat. No. 4,407,565.

Other types of light valve suspensions which do not incorporate such halogenated liquids can also be used and can maintain the particles in gravitational equilibrium if a sufficient quantity of stabilizing polymer is employed therein.

Another useful light valve suspension is based on the use as the liquid suspending medium of non-volatile or minimally volatile organic liquids, commonly classified as plasticizers. Such "plasticizer" liquid suspending media may comprise one or more electrically resistive, chemically inert, relatively non-volatile (high boiling) organic liquids that will suspend the particles and will dissolve the polymeric stabilizer. For example, where the polymeric stabilizer of a liquid light valve suspension includes a solid poly-(meth)acrylate, useful liquid suspending media include liquid plasticizers for poly(meth)acrylates, such as adipates, benzoates, glycerol triacetate, isophthalates, mellitates, oleates, chloroparaffins, phthalates, sebacates and the like. Liquid suspending media for other solid polymeric stabilizers may be similarly selected form liquids useful as plasticizers for such polymers. Preferably, trialkyltrimellitates, such as tri-n-propyl-or tri-n-butyl-trimellitate and/or dialkyl adipates, such as di-2-ethylhexyl adipate, may be used as the liquid suspending medium for solid polymeric stabilizers based on copolymers of neopentyl(meth)acrylate.

The polymeric stabilizer when employed, can be a single type of solid polymer that bonds to the surface of the particles but also dissolves in the non-aqueous liquid or liquids of the liquid suspending medium. Alternatively, there may be two or more solid polymeric stabilizers serving as a polymeric stabilizer system. For example, the particles can be coated with a first type of solid polymeric stabilizer such as nitrocellulose, which in effect, provides a plain surface coating for the particles and one or more additional types of solid polymeric stabilizer that bond to or associate with the first type of solid polymeric stabilizer and also dissolve in the liquid suspending medium to provide dispersion and steric protection for the particles.

Preferably, to keep the particles in suspension, the liquid suspending medium may also comprise as the solid polymeric stabilizer an A-B type block copolymer as disclosed in U.S. patent application Ser. No. 855,266, filed Mar. 26, 1992, and in European Patent Publication 350,354. Nitrocellulose and/or other solid polymeric stabilizers may also be usefully provided in the liquid suspending medium in addition to the block polymer. It is preferred to use just enough A-B block polymer to maintain the particles in suspension, the amount to be used for a given light valve suspension being empirically determined, as is known. Usually, the amount of the solid polymeric stabilizer will be from abut 1% to about 30%, such as from 5% to about 25%, by weight, based on the total weight of the light valve liquid suspension. However, while the use of a solid polymeric stabilizer is preferred, it need not be used in all cases. Indeed, liquid polymeric stabilizers may be used to advantage, as described in the aforesaid patent applications relating to films usable in light valves.

Light Valve Films

While the liquid light valve suspension can be used as such as the light-modulating element of a light valve, it is also possible to use as the light-modulating element a film having droplets of a liquid light valve suspension distributed in a polymer matrix. See U.S. Pat. Nos. 3,257,905, 3,341, 274 and 4,919,521 and copending U.S. applications Ser. Nos. 972,826 and 972,830, both filed Nov. 6, 1992, which are incorporated herein by reference thereto.

Thus, a film suitable for use in a light valve may comprise a cross-linked polymer matrix having droplets of a light valve suspension distributed in the matrix, the light valve suspension comprising particles suspended in a liquid suspending medium. The particles exhibit random Brownian movement in the absence of an electric field applied to the light valve suspension and become aligned in the presence of an electric field applied to the light valve suspension.

The film of the cross-linked polymer matrix having droplets of a light valve suspension distributed therein may be swollen with a suitable liquid. This improves the frequency response characteristics of the resulting film and reduces light scatter.

In a preferred embodiment of the invention, the cross-linked polymer matrix is a cross-linked polyorganosiloxane.

When the film is formed from a liquid cross-linkable polyorganosiloxane oligomer or polymer, it is preferred to emulsify a liquid cross-linkable polyorganosiloxane oligomer or polymer and a liquid light valve suspension with an organosiloxane/organic monomer copolymer as emulsifier, followed by treating a thin layer of the emulsion to cross-link the cross-linkable polyorganosiloxane oligomer or polymer, thereby forming the film.

A film suitable for use as the light modulating element of a light valve may also comprise a cross-linked polymer matrix that contains functional groups soluble in the liquid light valve suspension. In particular, the polymer matrix may be provided by a liquid cross-linkable copolymer emulsifier that includes such functional groups. The film may be formed by providing an emulsion of the liquid light valve suspension in a liquid cross-linkable copolymer emulsifier, followed by a cross-linking reaction. The liquid cross-linkable copolymer emulsifier not only provides the cross-linked polymer matrix, but also acts as an emulsifier in forming the film.

The film may also comprise a cross-linked polyorganosiloxane polymer matrix and the liquid light valve suspension distributed in the cross-linked polymer matrix may include a partially or fully fluorinated polymeric stabilizer, whereby the light scatter or "haze" of the light valve film is substantially reduced. Further improvements in the reduction of the haze may be obtained by providing the cross-linked-polyorganosiloxane polymer matrix with aromatic groups and/or by swelling the film with a partially or fully fluorinated organic liquid. As used herein, the term "fluorinated" means a partially or fully fluorinated material.

Ultraviolet Radiation and UV Absorbers

As used herein, the ultraviolet (UV) region of the electromagnetic spectrum comprises electromagnetic radiation having a wavelength in the range of about 100 Angstroms to about 4,000 Angstroms. Such UV radiation can be dangerous, especially to the eyes, but can also cause sunburn and can degrade many types of materials. As a result, it is very often important to block or absorb UV radiation in order to prevent or lessen such problems.

As is true for many materials, light valve suspensions are susceptible to degradation by ultraviolet radiation such as UV radiation from sunlight. Exposure of a light valve film and/or a light valve suspension to UV radiation can eventually lead to adverse changes in the suspension, such as color change and/or reduction in the contrast ratio for a given applied voltage. Because many of the applications of light valves involve exposing the light valve and the liquid light valve suspension therein to UV radiation, it is very important to reduce the degradative effect of such radiation on the light valve suspension. One can, of course, deposit a single or multilayer coating known in the art that absorbs or reflects ultraviolet radiation on the outside wall of a light valve facing any UV radiation that impinges on the light valve. Interception of UV radiation by such coating will reduce the amount of UV radiation reaching the light valve suspension inside the light valve and therefore be beneficial. However, such a coating may require a substantial expense that one would prefer to avoid.

Ultraviolet absorbers, sometimes referred to in the art as ultraviolet stabilizers, are substances that absorb radiant energy in the ultraviolet region of the electromagnetic spectrum. There are many known types of UV absorbers. Benzophenones are a widely used class of UV absorber. However, they generally have limited solubility in low polarity aliphatic liquids, and hence are not well suited for use in light valve suspensions. Other classes of possible UV absorbers such as phenol-nickel complexes are also not well suited for use in light valve suspensions because of factors such as poor solubility, too high electrical conductivity in some cases, or poor compatibility with the suspended particles.

SUMMARY OF THE INVENTION

In order to obtain the benefits of a good UV absorber while avoiding the problems associated with most types of UV stabilizers, we have found that UV absorbers of the class known as substituted or unsubstituted 2-(2'-hydroxyphenyl)-benzotriazoles meet the requirements of light valve suspensions excellently. (For convenience, these UV absorbers will be referred to herein as "benzotriazole derivatives.")

Liquid or solid benzotriazole derivatives can be dissolved in the liquid suspending medium of a liquid light valve suspension before or after the liquid light valve suspension is made. When the benzotriazole derivative is a highly miscible liquid, this can be particularly advantageous because the UV absorber can then comprise a substantial part of the liquid light valve suspension and thus be highly effective in preventing or reducing UV degradation of the light valve suspension. It is preferred that such a liquid benzotriazole derivative be non-volatile or of very low volatility so as to have very low vapor pressure and, if used in a film for a light valve, remain in the film.

There are several ways in which a U.V. stabilizer may be incorporated into a film containing droplets of a liquid. For instance, the U.V. stabilizer may be dissolved in a swelling agent used to treat the film and so be introduced into the film. See U.S. patent application Ser. No. 972,826. Or the U.V. stabilizer may be added to the liquid light valve suspension before mixing with the matrix polymer. Or the U.V. stabilizer may be mixed with the polymer matrix. Or the U.V. stabilizer may be incorporated directly into the polymer matrix (by substituting, for example, U.V. absorber molecules for some of the methyl groups in the polydimethylsiloxane polymer or other such substitution in other matrix polymers). Or the U.V. stabilizer may be directly incorporated into the stabilizing polymer via derivatisation of a U.V. stabilizer to a reactive monomer, and subsequent co-polymerization to yield the stabilizing polymer.

Monomers comprising UV-absorbing groups, preferably monomers which are benzotriazole derivatives, can be conveniently used as comonomers (1) in the stabilizing polymer of a liquid suspension and/or (2) as part of the structure of a matrix polymer used in a film form of the fluid suspension.

In another embodiment, the stabilizing polymer or the matrix polymer contains reactable groups which are reacted with a UV-absorbing material, such as a benzotriazole derivative, which has in its structure a group that will react with and bond to the reactable groups in the matrix polymer or stabilizing polymer.

It should be noted that when a light valve is able to block passage through it of substantially all or most UV radiation, the value of the light valve may be greatly enhanced because it can prevent objects on one side of the light valve from being degraded by UV radiation such as sunlight, which impinges on the light valve from the other side.

The present invention thus provides a liquid light valve suspension stabilized against exposure to ultraviolet radiation by including in the liquid light valve suspending medium of the light valve suspension an effective amount of a solid or liquid benzotriazole derivative.

The present invention also provides a liquid light valve suspension stabilized against exposure to UV radiation by incorporating into the polymeric stabilizer of the liquid light valve suspension copolymerized units of a monomer which comprises a UV-absorbing group, such as a benzotriazole derivative, in a UV-stabilizing effective amount.

The present invention also provides a UV-stabilized film for use as the light-modulating element of a light valve by using as a swelling agent for the film an effective amount of a liquid benzotriazole derivative and/or by incorporating into the matrix polymer of the film an effective amount of copolymerized units of a benzotriazole derivative.

DETAILED DESCRIPTION OF THE INVENTION

The benzotriazole derivatives useful in the present invention include those having the formula (I)

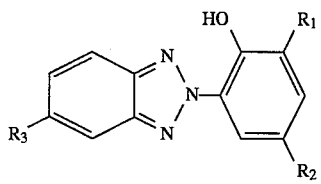

wherein $R_1$, $R_2$ and $R_3$ are independently hydrogen, halogen or an organic group. Where the benzotriazole is used as a comonomer, as described above, $R_1$ or $R_2$ will be an organic group having a polymerizable double bond, preferably a terminal polymerizable double bond. Suitably, $R_3$ is hydrogen, halogen, preferably chlorine, alkyl or alkoxy. Suitably, the organic group having a terminal polymerizable double bond may be derived from acrylic acid or methacrylic acid or esters or amides thereof.

Ciba-Geigy Corporation sells benzotriazole derivatives for use as UV absorbers under the registered trademark TINUVIN. These benzotriazoles have the formula (I) above. In Tinuvin 327, for example, $R_1$ and $R_2$ are each tertiary butyl and $R_3$ is chlorine. In Tinuvin 328, each of $R_1$ and $R_2$ is a $C(CH_3)_2CH_2CH_3$ group and $R_3$ is hydrogen. In Tinuvin 326 $R_1$ is tertiary butyl, $R_2$ is methyl and $R_3$ is chlorine. In Tinuvin P, $R_1$ and $R_3$ are each hydrogen and $R_2$ is methyl. All four of these compounds are solid powders at room temperature. Although all four of these compounds are soluble in some organic liquids, Tinuvin 328 is the most soluble in low polarity organic liquids and therefore, of this group, is most useful when dissolved in the liquid suspending medium of a light valve suspension or dissolved directly into the suspension itself.

Liquid benzotriazole derivatives are also known. For example, Tinuvin 384 is a liquid. Tinuvin 384 is of formula I, wherein $R_1$ is tertiary butyl, $R_2$ is —$CH_2CH_2COOC_8H_{17}$ and $R_3$ is hydrogen.

The greater the solubility of the UV absorber in the suspension, the more of it that can be put safely in the suspension without the risk of precipitation of the material, especially at cold temperatures, and the better the suspension will be protected from UV radiation. Also, the more UV radiation is absorbed by the suspension in a light valve, the more effective the light valve will be in preventing rugs, upholstery, paintings, etc., from being degraded by UV radiation when the light valve is used as a window.

It is also possible to greatly improve the stability of a light valve suspension to UV radiation by incorporating a UV-absorbing compound either in the polymeric stabilizer of the liquid suspension or in the matrix polymer of a light valve film.

Rigorous UV tests were performed on the liquid light valve suspensions and films described in the Examples using as the UV source equipment sold by Heraeus DSET Laboratories, Inc. of Phoenix, Ariz. under the name "Suntest CPS." This equipment puts out between 400 and 765 watts per square meter of total irradiance below 800nm, and was operated at maximum power for the tests described below.

EXAMPLE 1

A liquid light valve suspension in a light valve cell was subjected to the UV source for 605 hours. The suspension comprised 2.5% paste (comprising particles of Pyrazine-2, 5-dicarboxylic acid calcium polyiodide coated with nitrocellulose polymer), 20.5% tri-n-butyl trimellitate, 3.16% of a stabilizing polymer which was an A-B block copolymer of neopentylmethacrylate/hydroxyethylmethacrylate having a number average molecular weight of about 309,000 and 70 monomer units of hydroxyethyl methacrylate, 69.84% Halocarbon Oil Type 0.8 (sold by Halocarbon Products, Hackensack, N.J.) and 4% Tinuvin 328. After exposure to the UV source for 605 hours, no substantial change in either color or absorbance was observed.

EXAMPLE 2

A film was made by combining, emulsifying and crosslinking with heat 2.07 g. of dihydroxy-terminated polydimethylsiloxane having a molecular weight of about 150,000 with 0.04 g. of tetrabutylorthosilicate, 0.05 g. of dibutyltindilaurate, 0.2 g. of a Polydimethylsiloxane/neopentylmethacrylate block copolymer emulsifier and 0.74 g. of a particle concentrate. The concentrate was a viscous concentrated liquid suspension comprising 20% paste (comprising particles of pyrazine -2,5 dicarboxylic acid calcium polyiodide coated with nitrocellulose polymer), 20% of an A-B block stabilizing copolymer of neopentyl methacrylate/hydroxyethylmethacrylate having a number average molecular weight of about 349,000 and only 8 hydroxyethylmethacrylate monomeric units, and 60% of tri-n-propyl trimellitate plasticizing liquid. The crosslinked film was swollen with a 10% solution of Tinuvin 328 in 3,6-dimethyloctane. The swollen film was placed in a light valve cell and exposed to the UV source for 575 hours with no substantial change in either the color or absorbance of the film.

EXAMPLES 3 AND 4

Examples 1 and 2 are repeated using Tinuvin 384, a liquid UV absorber, in place of Tinuvin 328, a solid, with similar results.

Numerous examples of UV-absorbing monomers are known. For example, polymerizable monomers comprising substituted and unsubstituted benzotriazole derivatives are disclosed in U.S. Pat. Nos. 4,528,311, 4,612,358, 4,868,251, 4,785,063 and 5,112,912. Examples of copolymerizable monomeric UV absorbers other than benzotriazole derivatives are set forth, for example, in U.S. Pat. Nos. 3,162,676 and 4,304,895 and in British Patent 885,986.

Such UV-absorbing monomers, preferably comprising only one polymerizable terminal double bond, can readily be incorporated into any of the stabilizing polymers and/or matrix polymers disclosed in the light valve art or in the present invention and will have the effect of appreciably improving the UV resistance of the light valve suspension in which they are incorporated.

One may also attach UV-absorbing groups to either the stabilizing polymer or the matrix polymer by reacting a UV-absorbing material which comprises a reactable group with a suitable reactable group in the stabilizing polymer or matrix polymer, so as to bond the UV-absorbing material to the stabilizing or matrix polymer. For example, a stabilizing or matrix polymer may comprise glycidyl acrylate or methacrylate groups. Such groups will react with a UV-absorbing compound such as a benzotriazole derivative that includes a carboxyl group or other reactable group. Such processes, compounds and copolymers are disclosed in U.S. Pat. No. 5,112,912.

The amount of the UV absorber will, of course, be empirically determined to provide the desired UV absorbance. Where the UV absorber is in the liquid light valve suspension, useful amounts may be about 1% by weight or less, usually about 3% or more, based on the weight of the light valve suspension. Where a liquid UV absorber is used, it may provide all of the liquid suspending medium, and this may constitute more than about 70% by weight of the light valve suspension. Where the light modulating element is in the form of a film, the matrix polymer and the liquid light valve suspension each preferably contains the UV absorber, so that the total amount of the UV absorber is at least 1% preferably more than about 3%, based on the total weight of the light modulating element.

While specific embodiments of the invention have been illustrated, it will be appreciated that the invention is not limited thereto, since many modifications may be made by one skilled in the art which fall within the true spirit and scope of the invention.

We Claim:

1. A liquid light valve suspension, which comprises particles suspended in a liquid suspending medium, the liquid suspending medium having dissolved therein a UV-absorbing effective amount of a benzotriazole derivative.

2. The suspension according to claim 1, wherein said benzotriazole derivative is a liquid.

3. The suspension according to claim 1, wherein said benzotriazole derivative is a solid.

4. In a light valve having opposed cell walls, and a light modulating element between said cell walls, the improvement wherein the light modulating element is the liquid light valve suspension of claim 1.

5. A liquid light valve suspension, which comprises particles suspended in a liquid suspending medium and a stabilizing polymer in said liquid suspending medium to prevent agglomeration of said particles, said stabilizing polymer comprising a UV-absorbing effective amount of a UV absorber.

6. The suspension according to claim 5, wherein said stabilizing polymer comprises monomeric units thereof copolymerized with monomeric units of said UV absorber.

7. The suspension according to claim 6, wherein said UV absorber is a benzotriazole derivative having a group copolymerizable with said monomeric units of said polymeric stabilizer.

8. The suspension according to claim 5, wherein said UV absorber is bound to said stabilizing polymer by reaction therewith.

9. The suspension according to claim 8, wherein said UV absorber is a benzotriazole derivative having a group that can react with said polymeric stabilizer.

10. The suspension according to claim 5, wherein said UV absorber is a benzotriazole derivative.

11. In a light valve having opposed cell walls, and a light modulating element between said cell walls, the improvement wherein the light modulating element is the liquid light valve suspension of claim 5.

12. A film suitable for use as the light modulating element of a light valve, comprising a polymer matrix and droplets of a liquid light valve suspension distributed in the polymer matrix, the polymer matrix or the liquid light valve suspension or both including a UV-absorbing effective amount of a UV absorber.

13. The film according to claim 12, wherein the light valve suspension has said UV absorber dissolved therein.

14. The film according to claim 13, wherein said UV absorber is a benzotriazole derivative.

15. The film according to claim 12, wherein said light valve suspension comprises a stabilizing polymer to prevent agglomeration of said particles, said stabilizing polymer comprising a UV-absorbing effective amount of a UV absorber.

16. The film according to claim 15, wherein said stabilizing polymer comprises monomeric units thereof copolymerized with monomeric units of said UV absorber.

17. The film according to claim 16, wherein said UV absorber is a benzotriazole derivative having a group copolymerizable with said monomeric units of said polymeric stabilizer.

18. The film according to claim 15, wherein said UV absorber is bound to said stabilizing polymer by reaction therewith.

19. The film according to claim 18, wherein said UV absorber is a benzotriazole derivative having a group that can react with said polymeric stabilizer.

20. The film according to claim 12, wherein said polymer matrix comprises monomeric units thereof copolymerized with monomeric units of said UV absorber.

21. The film according to claim 20, wherein said UV absorber is a benzotriazole derivative having a group copolymerizable with said monomeric units of said polymer matrix.

22. The film according to claim 21, wherein said UV absorber is a benzotriazole derivative having a group that can react with said polymer matrix.

23. The film according to claim 12, wherein said UV absorber is bound to said polymer matrix by reaction therewith.

24. In a light valve having opposed cell walls, and a light modulating element between said cell walls, the improvement wherein the light modulating element is the film of claim 12.

* * * * *